(12) United States Patent
Adsule

(10) Patent No.: US 11,381,555 B2
(45) Date of Patent: Jul. 5, 2022

(54) STATE TOKEN BASED APPROACH TO SECURE WEB APPLICATIONS

(71) Applicant: T-MOBILE USA, INC., Bellevue, WA (US)

(72) Inventor: Dharmendra Adsule, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 175 days.

(21) Appl. No.: 16/829,722

(22) Filed: Mar. 25, 2020

(65) Prior Publication Data

US 2021/0306314 A1    Sep. 30, 2021

(51) Int. Cl.
*H04L 9/40* (2022.01)

(52) U.S. Cl.
CPC .......... *H04L 63/083* (2013.01); *H04L 63/102* (2013.01); *H04L 63/108* (2013.01)

(58) Field of Classification Search
CPC .... H04L 63/083; H04L 63/102; H04L 63/108
USPC .......................................................... 726/9
See application file for complete search history.

(56) References Cited

U.S. PATENT DOCUMENTS

| | | | | |
|---|---|---|---|---|
| 10,673,862 | B1 * | 6/2020 | Threlkeld | H04L 63/08 |
| 2005/0050438 | A1 * | 3/2005 | Cheung | G06F 9/453 |
| | | | | 715/206 |
| 2007/0150591 | A1 * | 6/2007 | Kimura | G06F 21/554 |
| | | | | 709/225 |
| 2008/0115201 | A1 * | 5/2008 | Sturms | H04L 63/1441 |
| | | | | 726/9 |
| 2014/0244488 | A1 * | 8/2014 | Kim | G06Q 20/02 |
| | | | | 705/39 |
| 2017/0006020 | A1 * | 1/2017 | Falodiya | H04L 63/0838 |
| 2019/0297147 | A1 * | 9/2019 | Drasin | H04L 67/148 |

OTHER PUBLICATIONS

Haekal, Muhamad. "Token-based authentication using JSON web token on SIKASIR RESTful web service." In 2016 International Conference on Informatics and Computing (ICIC), pp. 175-179. IEEE, 2016. (Year: 2016).*

* cited by examiner

*Primary Examiner* — Oscar A Louie
*Assistant Examiner* — Melaku Y Habtemariam
(74) *Attorney, Agent, or Firm* — Marshall, Gerstein & Borun LLP

(57) ABSTRACT

Techniques for securing a single page application (SPA) are provided. An API server that receives an API call from an SPA to navigate a first user to a first state of the SPA navigates the first user to the first state of the SPA and generates a first token indicating that the first user has accessed the first state of the SPA. When the API server receives a request from the first user to navigate to a second state of the SPA (the request including the first token), the API server verifies that the first token indicating that the first user has accessed the first state of the SPA is valid for the second state of the SPA before navigating the first user to the second state of the SPA. Additionally, the API server expires the first token upon navigating the first user to the second state of the SPA.

20 Claims, 4 Drawing Sheets

STATE TOKEN BASED APPROACH TO SECURE WEB APPLICATIONS

FIELD OF THE DISCLOSURE

The present disclosure generally relates to securing single page web applications.

BACKGROUND

In a traditional web application, each user request is sent to the server hosting the web application for processing. Consequently, it takes non-trivial skills to compromise the server and execute an attack because the server-side code, API orchestration, and business logic are all hidden from the user. However, many businesses now use single page applications (SPAs) rather than traditional web applications because SPAs do not require the page to be reloaded as users take actions or navigate between states (e.g., areas) of the application, allowing the SPA to load more quickly and be more responsive to user actions.

Typical SPAs are powered by application programming interfaces (APIs). User interactions trigger API calls to the server, and the response is interpreted by the client application. Network calls are made from a user's browser to an API server/gateway. APIs can be vulnerable to attack because the methodology of constructing the API call is handled on the client (e.g., browser) and the information sent to the API over standard Internet communication protocols (e.g., HTTP/HTTPS) is visible to anyone using standard development tools available in the browser. Moreover, there are advanced network proxies that can intercept such calls and inspect the semantics of the call. With this information, a malicious user can craft arbitrary requests and replay them to mimic user interface (UI) behavior and to potentially exploit innocuous APIs to their advantage.

For example, a malicious user can mine data via an API. For instance, a website associated with a mobile device company may include a SIM number validation page. A typical user must navigate from a home page, to a "tools" page, to a "verify SIM" page to invoke the API. However, a malicious user can explore the SPA using standard development tools available in his browser to catalog the available APIs that can be used to mine data. Using a "getSimDetail" API, the malicious user can pass an arbitrary SIM number to an associated server and receive a response based on whether it is available in the system or not. The malicious user can then use freely available tools, code, clients or proxies to craft a request for an arbitrary SIM number and automate it by writing code for making this request. Using the automated code, the malicious user can quickly identify a full list of valid SIM numbers. Such data-mining requests typically go un-noticed until they hit specific rate-limits imposed by the server/gateway or other network intermediaries. Because these rate-limits typically do not differentiate between individual API calls, rate-limits alone cannot effectively stop such events.

As another example, a malicious user, such as a competitor of a mobile device company, can mine device specification data from the mobile device company's website. Although this device specification is openly available from the mobile device company's website, it is not typically all available at once. That is, a user browsing the website as intended may access device specification data for a particular device by inputting information about that device, but would need to individually input information about another device to access device specification data for the second device. However, a malicious user can leverage existing client tools or code to send multiple requests to access specification data about all of the devices in the mobile device company's inventory, allowing the malicious user such as a competitor to exploit this undue advantage for competitive gains. As discussed above, such data-mining requests typically go un-noticed until they hit specific rate-limits imposed by the server/gateway or other network intermediaries, but because these rate-limits typically do not differentiate between individual API calls, rate-limits alone cannot effectively stop such events.

As still another example, a malicious user can obtain employee login credentials for a mobile device company's website (via a "phishing" attack or by some other means). The malicious user is then able to access employee-only features of the SPA. For instance, for anSPA associated with a mobile device company, the malicious user may be able to access a feature for unlocking or "jailbreaking" a particular mobile device (i.e., allowing the mobile device to be used with other mobile device networks). The malicious user can use freely available tools, code, clients or proxies to craft a request to unblock a device that accepts an arbitrary IMEI number, and can build capability to replay this request for any number of times by writing code to automate the request. In this scenario, because the malicious user has the proper login credentials, there are typically no explicit rate limits imposed on any request generated by the malicious user. Consequently, the malicious user could quickly jailbreak a series of mobile devices or change network permissions or connection settings without authorization of device owners.

The background description provided herein is for the purpose of generally presenting the context of the disclosure. Work of the presently named inventors, to the extent it is described in the background section, as well as aspects of the description that may not otherwise qualify as prior art at the time of filing, are neither expressly nor impliedly admitted as prior art against the present disclosure.

SUMMARY

The present disclosure provides techniques for securing single page applications (SPAs). A Finite State Machine (FSM) based security scheme secures application integrity by allowing the SPA to identify and reject orchestrated calls by malicious users, and by making orchestrated call simulation expensive or time consuming for malicious users. When a user's session accessing an SPA is initiated, a token (a string generated on the API server/gateway) is sent to the client from the API server/gateway. A subsequent API request is signed by the token and sent over the network to the API server/gateway. The API server/gateway correlates the presented token with the issuing state and determines whether all transition rules associated with that state have been satisfied. For example, the token's issuing state may include an indication of a state of the SPA the user was accessing when he or she received the token. For instance, the transition rule may require that only users having tokens with an issuing state indicating a first state of the SPA may access a second state of the SPA. That is, transition rules may require that states of the SPA can only be accessed in a particular order.

If the presented token correlates with the issuing state and the transition rule requirements for accessing the second state of the SPA, the API server/gateway accepts the requests (e.g., navigating the user to the second state of the SPA). If the presented token does not correlate with the issuing state and the transition rule, the API server/gateway identifies the request as a manufactured request and rejects the request (e.g., not allowing the user to access the second state of the SPA). Each token corresponds to a particular state and is perishable on use to guarantee against re-use for subsequent API requests. In some examples, expired tokens for a particular session may persist on the server to track state navigation, which may be useful in identifying session replaying attacks.

Advantageously, by verifying that a user has a valid and non-expired token each time the user requests to navigate to a subsequent state of the SPA, the techniques of the present disclosure prevent or greatly slow down data mining attacks from malicious users. For example, a user attempting to repeatedly navigate to the same state of the SPA for data mining or other malicious purposes (e.g., repeatedly navigating to a state of the SPA for validating a series of arbitrary SIM numbers, repeatedly requesting to access specification data about a series of devices, repeatedly jailbreaking a series of devices, etc., as discussed in the examples above) will be slowed down because he or she will be required to access a particular state of the SPA prior to accessing the SIM number data or specification data. For instance, in some embodiments, to access a "device details" state of the SPA for a particular device, a user must first navigate to a "homepage" state of the SPA and then to a "browse devices" state of the SPA. If a user attempts to navigate directly to the "device details" state of the SPA without first navigating to the "homepage" state of the SPA and then the "browse devices" state of the SPA, the user's request is denied. Similarly, if a user attempts to navigate from the "device details" state of the SPA again immediately after accessing it a first time, the user's request is denied. Thus, a malicious user who creates code that automatically generates repeated requests to navigate to the "device details" state of the SPA for a series of different devices will be denied after accessing the "device details" state of the SPA the first time. The malicious user will then be required to first navigate to the "homepage" state of the SPA and then the "browse devices" state of the SPA before navigating to "device details" each time, slowing him or her down and making it much more difficult for the malicious user to rapidly obtain information via data mining.

In one aspect, a computer-implemented method for securing a single page application is provided, the method comprising: receiving, at an API server, a call from an SPA to navigate a first user to a first state of the SPA; navigating the first user to the first state of the SPA by the API server; generating a first token indicating that the first user has accessed the first state of the SPA by the API server; receiving a request at the API server from the first user to navigate to a second state of the SPA, the request including the first token; verifying that the first token indicating that the first user has accessed the first state of the SPA is valid for the second state of the SPA by the API server; navigating, the first user to the second state of the SPA based on the API server verifying the first token by the API server; and expiring the first token upon navigating the first user to the second state of the SPA by the API server.

In another aspect, a computer system for securing a single page application is provided, the computer system comprising: an API server, the API server comprising: one or more processors; and a non-transitory program memory communicatively coupled to the one or more processors and storing executable instructions that, when executed by the one or more processors, cause the processors to: receive an API call from an SPA to navigate a first user to a first state of the SPA; navigate the first user to the first state of the SPA; generate a first token indicating that the first user has accessed the first state of the SPA; receive a request from the first user to navigate to a second state of the SPA, the request including the first token; verify that the first token indicating that the first user has accessed the first state of the SPA is valid for the second state of the SPA; navigate the first user to the second state of the SPA based on verifying the first token; and expire the first token upon navigating the first user to the second state of the SPA.

In still another aspect, a tangible, non-transitory computer-readable medium storing executable instructions for securing a single page application is provided that, when executed by at least one processor of a computer system, cause the at least one processor to: receive a call from a single page application (SPA) to navigate a first user to a first state of the SPA; navigate the first user to the first state of the SPA; generate a first token indicating that the first user has accessed the first state of the SPA; receive a request from the first user to navigate to a second state of the SPA, the request including the first token; verify that the first token indicating that the first user has accessed the first state of the SPA is valid for the second state of the SPA; navigate the first user to the second state of the SPA based on verifying the first token; and expire the first token upon navigating the first user to the second state of the SPA.

BRIEF DESCRIPTION OF THE DRAWINGS

The figures described below depict various aspects of the systems and methods disclosed herein. Advantages will become more apparent to those skilled in the art from the following description of the embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive. Further, wherever possible, the following description refers to the reference numerals included in the following figures, in which features depicted in multiple figures are designated with consistent reference numerals.

DETAILED DESCRIPTION

Figure 1:
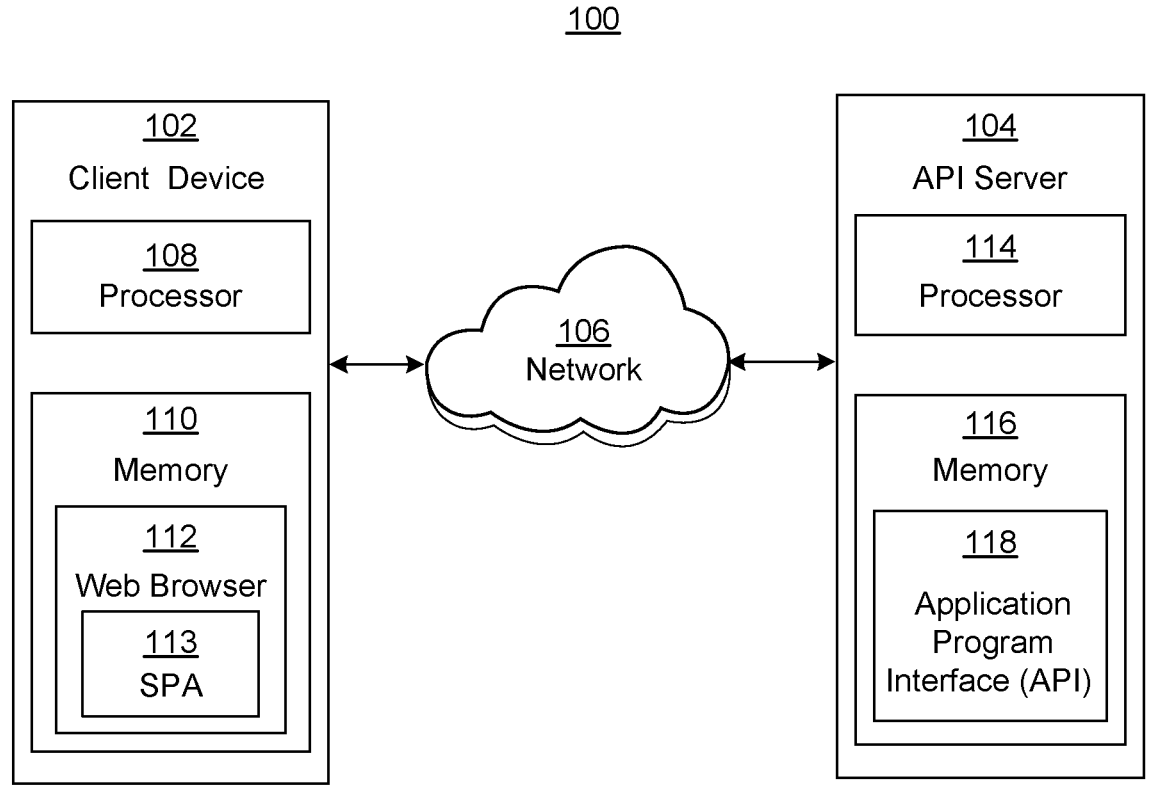
FIG. 1 illustrates a block diagram of an exemplary system for securing a single page web application (SPA), in accordance with some embodiments.

FIG. 1 illustrates a block diagram of an exemplary system 100 for securing a single page application (SPA), in accordance with some embodiments. The high-level architecture illustrated in FIG. 1 may include both hardware and software applications, as well as various data communications channels for communicating data between the various hardware and software components, as is described below. The system 100 may include a client device 102 and an application programming interface (API) server 104. The client device 102 and the API server 104 may be configured to wirelessly communicate with one another via a network 106.

The client device 102 is configured to run, via a web browser application 112, an SPA 113 that transmits API calls to the API server 104 and receives API responses from the API server 104. The client device 102 may include one or more processors 108, such as one or more microprocessors, controllers, and/or any other suitable type of processor. The client device 102 may further include a memory 110 (e.g., volatile memory or non-volatile memory) accessible by the one or more processors 108 (e.g., via a memory controller). The one or more processors 108 may interact with the memory 110 to obtain, for example, computer-readable instructions stored in the memory 110 for running the web browser application 112. Additionally or alternatively, computer-readable instructions may be stored on one or more removable media (e.g., a compact disc, a digital versatile disc, removable flash memory, etc.) that may be coupled to the client device 102 to provide access to the computer-readable instructions stored thereon. In particular, the computer-readable instructions stored on the memory 110 may include instructions for carrying out any of the steps of the method 400 described in greater detail below with respect to FIG. 4.

The API server 104 is configured to implement one or more application programming interfaces (APIs) 118 configured to receive API calls from the client device 102 and transmits API responses to the client device 102. Although referred to herein as a unitary interface, the API 118 includes a plurality of separate APIs 118 in some embodiments, each such API 118 being configured to receive certain predefined types of requests from client devices 102 and to provide certain predefined types of responses to such client devices 102. The API server 104 may include one or more processors 114, such as one or more microprocessors, controllers, and/or any other suitable type of processor. The API server 104 may further include a memory 116 (e.g., volatile memory or non-volatile memory) accessible by the one or more processors 114 (e.g., via a memory controller). The one or more processors 114 may interact with the memory 116 to obtain, for example, computer-readable instructions stored in the memory 116 for running the API 118. Additionally or alternatively, computer-readable instructions may be stored on one or more removable media (e.g., a compact disc, a digital versatile disc, removable flash memory, etc.) that may be coupled to the API server 104 to provide access to the computer-readable instructions stored thereon. In particular, the computer-readable instructions stored on the memory 116 may include instructions for carrying out any of the steps of the method 400 described in greater detail below with respect to FIG. 4.

For example, based on a user request to access the SPA 113 received from the client device 102, the API 118 may transmit an API response for navigating the user to a first state of the SPA 113 (e.g., a "homepage" state of the SPA 113). Upon navigating the user to the first state of the SPA 113, the API 118 may generate a token indicating that the user has accessed the first state of the SPA 113 (e.g., a "homepage" token). When the API 118 receives a user request to navigate to a second state of the SPA 113 (e.g., a "browse devices" state of the SPA 113), the API 118 may verify that the token indicating that the user has accessed the first state of the SPA 113 is valid for accessing the second state of the SPA 113 before transmitting an API response for navigating the user to the second state of the SPA 113 (e.g., verifying that there is a token indicating that the user has accessed the "homepage" state of the SPA 113 and valid for accessing the "browse devices" state of the SPA 113 before allowing the user to access the "browse devices" state of the SPA 113). The API 118 may expire the token associated with the first state of the SPA 113 upon transmitting the API response navigating the user to the second state of the SPA 113 (e.g., expiring the "homepage" token once the user navigates to the "browse devices" state of the SPA 113). Additionally, the API 118 may generate a new token indicating that the user has accessed the second state of the SPA 113 (e.g., a "browse devices" token) and valid for allowing the user to access a third state of the SPA 113.

That is, the token indicating that the user has accessed the second state of the SPA 113 must be verified by the API 118 before the API 118 will transmit an API response to the client device 102 allowing the user to access the third state of the SPA 113 (e.g., a "device detail" state of the SPA 113). Furthermore, the token indicating that the user has accessed the second state of the SPA 113 expires upon the user accessing the third state of the SPA. Similarly, a token indicating that the user has accessed third state of the SPA 113 (e.g., a "device detail" token) must be verified by the API 118 before the API 118 will transmit an API response allowing the user to access a fourth state of the SPA 113 (e.g., an "add to cart" state of the SPA 113), and the token indicating that the user has accessed the third state of the SPA expires upon the user accessing the fourth state of the SPA, and so on, until the user accesses a terminal state of the SPA at which tokens are not generated.

In particular, the API 118's token verification ensures that a user can only access the various states of the SPA 113 in a particular order (e.g., first state, followed by second state, followed by third state, followed by fourth state, etc.). If user requests access the third state of the SPA 113 without the token indicating that he or she has accessed the second state of the SPA 113 (or with an expired token indicating that he or she has accessed the second state of the SPA 113), the API 118 transmits an API response to the client device 102 denying the user access to the third state of the SPA 113.

Figure 2:
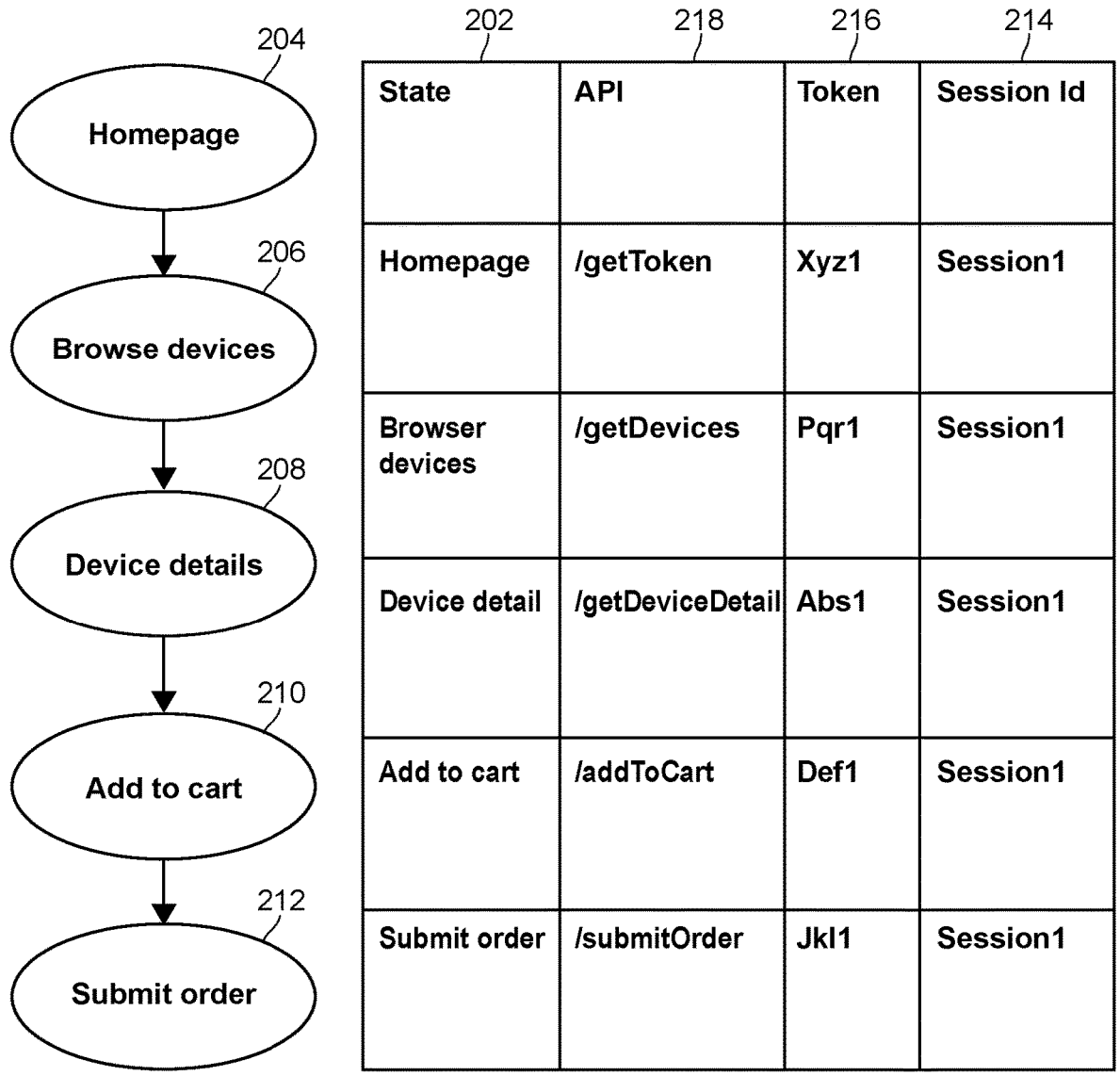
FIG. 2 illustrates an example state representation for an SPA, in accordance with some embodiments.

FIG. 2 illustrates an example state representation for an SPA (e.g., SPA 113), in accordance with some embodiments. In an example, a user (e.g., a user of a client device 102) may only transition from different states 202, i.e., different states of the SPA, in a particular order. For example, starting from a "homepage" state 204 of the SPA, a user may navigate to a "browse devices" state 206 of the SPA, and may navigate from the "browse devices" state 206 of the SPA to a "device detail" 208 state of the SPA. From the "device detail" state 208 of the SPA, the user may navigate to an "add to cart" state 210 of the SPA, and from the "add to cart" state 210 of the SPA the user may navigate to a "submit order" state 212 of the SPA. The order of the states 202 is not commutative, and states 202 can only transition in the order shown in FIG. 2. As the SPA initializes a session 214 for the user (e.g. "Session1"), the server generates tokens 216 for each state (e.g., "Xyz1" for the "homepage" state 204; "Pqr1" for the "browse devices" state 206; "Abs1" for the "device detail" state 208; "Def1" for the "add to cart" state 210; "Jkl1" for the "submit order state 212; etc., as shown in FIG. 2) and returns them to the client as the user makes API calls 218 and continues in the request response. Each request is matched to the state-token combination as well as the state 202 in a finite state machine (FSM) and only then processed. For example, if a "homepage" token ("Xyz1") is used in a "device detail call," it would be rejected as only the token 216 issued by the "browse devices" state 206 ("Pqr1") can be used by the "device detail" state 208.

Figure 3:
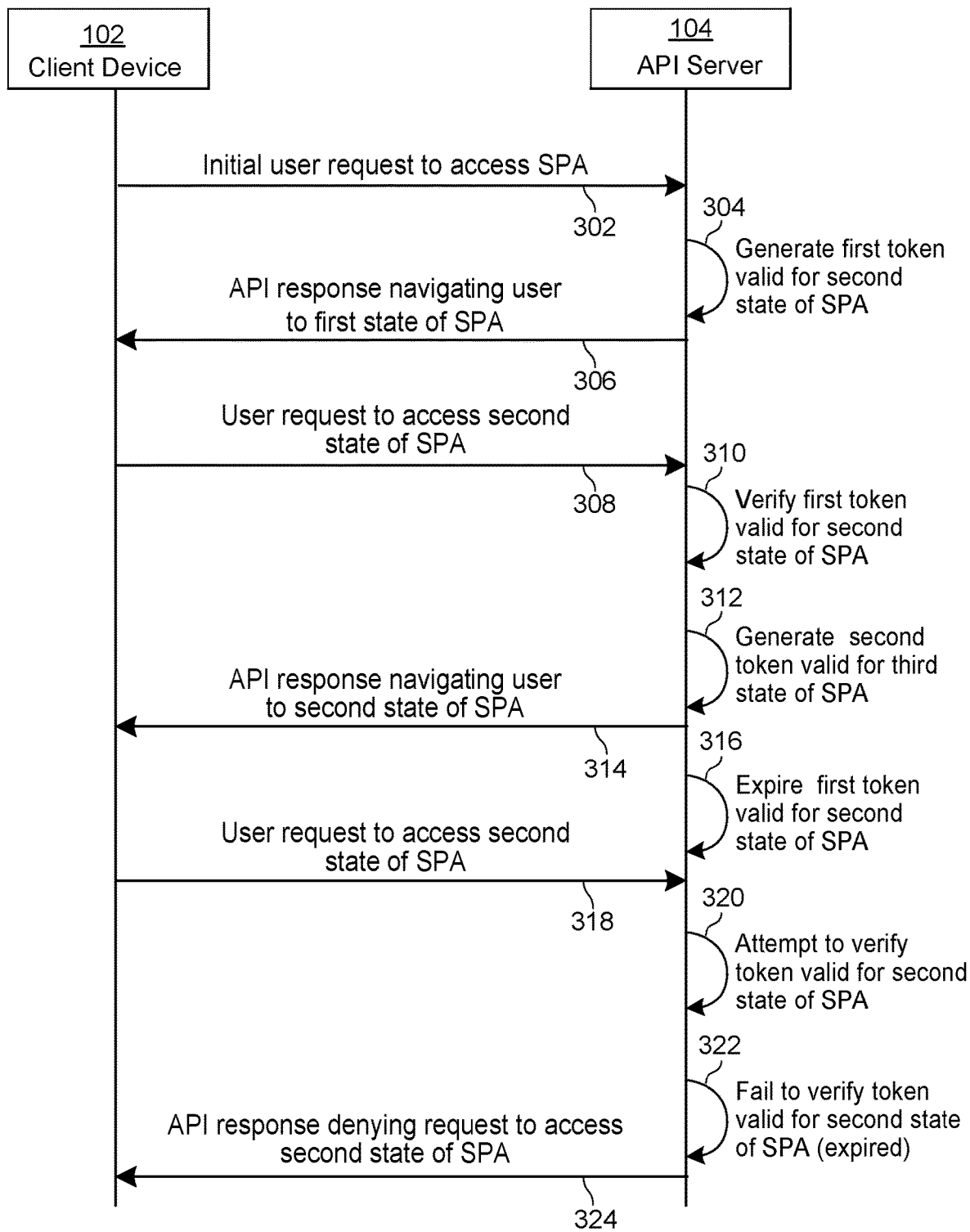
FIG. 3 illustrates a signal diagram associated with an exemplary communication process for securing an SPA, in accordance with some embodiments.

FIG. 3 illustrates a signal diagram associated with an exemplary communication process 300 for securing an SPA, in accordance with some embodiments. The communication process 300 includes communication between a client device 102 and an API server 104, which are communicatively connected by the network 106, as described above.

The communication process 300 may begin when the client device 102 transmits an initial user request to access an SPA (line 302) to the API server 104. The API server 104 may generate a first token indicating that the user has accessed the first state of the SPA, which first token is valid for accessing the second state of the SPA (line 306).

Furthermore, the API server 104 may transmit an API response to the client device 102 for navigating the user to a first state of the SPA (line 304). For instance, the first state of the SPA may be a default "homepage" state of the SPA. In some embodiments, the first token may be sent to the client device 102 as part of the API response.

The client device 102 may transmit a user request to navigate to a second state of the SPA to the API server 104 (line 308). For example, the second state of the SPA may be a "browse devices" state of the SPA. The API server 104 may verify that the first token indicating that the user has accessed the first state of the SPA is valid for accessing the second state of the SPA (line 310). Furthermore, the API server 104 may generate a second token indicating that the user has accessed the second state of the SPA, which second token is valid for accessing the third state of the SPA (line 312).

After verifying the first token, the API server 104 may transmit an API response to the client device 102 for navigating the user to the second state of the SPA based on the verified first token indicating that the user has accessed the first state of the SPA (line 314). In some embodiments, the second token may be sent to the client device 102 as part of the API response. Once the user navigates to the second state of the SPA, the API server may expire the first token indicating that the user has accessed the first state of the SPA (line 316).

The client device 102 may transmit another user request to navigate to the second state of the SPA to the API server 104 (line 318). The API server 104 may attempt to verify whether there is a token valid for accessing the second state of the SPA (line 320). However, due to the expiration of the token indicating that the user had accessed the first state of the SPA and valid for accessing the second state of the SPA (at line 314), or, in other examples, due to the user never having accessed the first state of the SPA at all, the API server 104 may fail to verify that there is a token valid for accessing the second state of the SPA (line 322). Consequently, based on the API server 104's failure to verify an unexpired token valid for accessing the second state of the SPA, the API server 104 may transmit an API response to the client device 102 denying the user access to the second state of the SPA (line 324).

Figure 4:
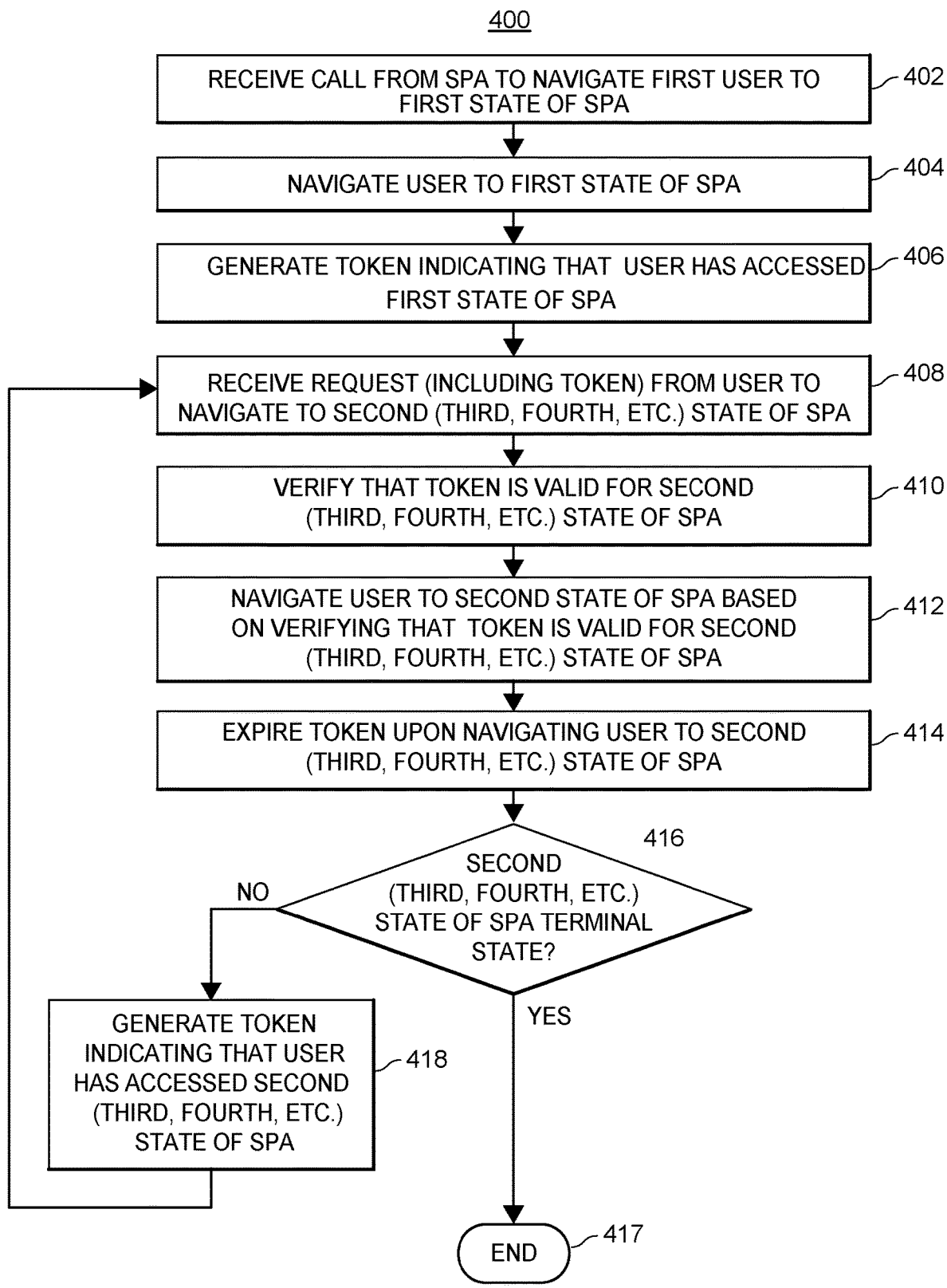
FIG. 4 illustrates a flow diagram of an exemplary method for securing an SPA, in accordance with some embodiments.

FIG. 4 illustrates a flow diagram of an exemplary method 400 for securing an SPA, in accordance with some embodiments. One or more steps of the method 400 may be implemented as a set of instructions stored on a computer-readable memories 110 and/or 116 and executable on one or more processors 108 and/or 114.

At block 402, an SPA (e.g., the SPA 113) may call an API from an API server (e.g., the API 118 of the API server 104) based on a request from a user to navigate to a first state of the SPA. At block 404, in response to receiving such API call, the API server may provide data to navigate the user to the first state of the SPA. At block 406, the API server may generate a token indicating that the user has accessed the first state of the SPA and provide the token to the user. In some embodiments, such token may be generated and sent to the user together with a response to the API call from the user that navigates the user to the first state of the SPA. The token may be valid for accessing a second state of the SPA. In some embodiments, the token may further be valid for accessing one or more additional states of the SPA, which one or more additional states may comprise a subset containing less than all the states of the SPA.

At block 408, the API server may receive a request from the user to navigate to a second state of the SPA (e.g., a second area or functionality of the SPA). The request may include the token. For example, the first and second states of the SPA may provide distinct functionality through distinct API calls. For instance, the first state of the SPA may be associated with validating a subscriber identity module (SIM) number, while the second state of the SPA is associated with getting details regarding user equipment (UE) devices. As another example, the first state of the SPA may be associated with unlocking UE devices, while the second state of the SPA is associated with getting a list of the UE devices.

At block 410, the API server may verify that the token indicating that the user has accessed the first state of the SPA is valid for accessing the second state of the SPA. In some examples, verifying that the token is valid for the second state of the SPA may include verifying that the first token is associated with the particular user attempting to access the second state of the SPA (e.g., by matching a user session ID of the request to a user session ID associated with the token). Furthermore, in some examples, verifying that the token is valid for the second state of the SPA may include determining the first state of the SPA associated with the token, identifying one or more transition rules applicable to the first state, and determining that the request from the user to navigate to the second state of the SPA satisfies at least one set of minimum requirements of the one or more transition rules.

At block 412, the API server may navigate the user to the second state of the SPA based on the API server verifying the validity token for accessing the second state of the SPA. At block 414, the API server may cause the token indicating that the user has accessed the first state of the SPA to expire, e.g., once the API server navigates the user to the second state of the SPA.

At block 416, the API server may determine whether the current state (e.g., the second state) is a terminal state. If so, the process may end at block 417, and no further tokens may be generated. If not, the API server may generate a new token that the user has accessed the second state of the SPA at block 418. The method may then proceed to block 408, as the API server may receive a request from the user to navigate to a third state of the SPA, fourth state of the SPA, fifth state of the SPA, etc., in subsequent iterations. The method may proceed as the API server verifies that there is a valid token for accessing each the requested state (e.g., a token from a previous state) before navigating the user to the requested state, expires the token for accessing the requested state after navigating the user to the requested state, and generates a new token indicating that the user has accessed the requested state, until the user reaches a terminal state and no further tokens are generated. Although the exemplary method 400 describes the tokens as being generated after the user has been navigated to the next state, some embodiments may instead generate the tokens prior to or concurrently with navigating the user to the next state. In some such embodiments, the API server may provide the newly generated token to the user together with the requested data that causes the user to navigate to the next state.

In some examples, the method 400 further includes the API server receiving a request from a second user to navigate to the second state of the SPA. The API server may attempt to verify whether there is a token indicating that the second user has accessed the first state of the SPA. If the API server fails to verify that the second token is associated with the second user indicating that the second user has accessed the first state of the SPA (e.g., because the token indicating that the second user has accessed the first state of the SPA is expired, or because a token indicating that the second user has accessed the first state of the SPA prior to navigating to the second state of the SPA simply does not exist), the API server may deny the second user's request to navigate to the second state of the SPA.

Although the preceding text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

Throughout this specification, unless indicated otherwise, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may likewise be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Hardware modules can provide information to, and receive information from, other hardware modules. Accordingly, the described hardware modules may be regarded as being communicatively coupled. Where multiple such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, in some embodiments, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" or "in some embodiments" in various places in the specification are not necessarily all referring to the same embodiment or embodiments.

Some embodiments may be described using the terms "coupled," "connected," "communicatively connected," or "communicatively coupled," along with their derivatives. These terms may refer to a direct physical connection or to an indirect (physical or communication) connection. For example, some embodiments may be described using the term "coupled" to indicate that two or more elements are in direct physical or electrical contact. The term "coupled," however, may also mean that two or more elements are not in direct contact with each other, but yet still co-operate or interact with each other. Unless expressly stated or required by the context of their use, the embodiments are not limited to direct connection.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the words "a" or "an" are employed to describe elements and components of the embodiments herein. This is done merely for convenience and to give a general sense of the description. This description, and the claims that follow, should be read to include one or at least one, and the singular also includes the plural unless the context clearly indicates otherwise.

Upon reading this disclosure, those of skill in the art will appreciate still additional alternative structural and functional designs for securing single page web applications. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

Finally, the patent claims at the end of this patent application are not intended to be construed under 35 U.S.C. § 112(f), unless traditional means-plus-function language is expressly recited, such as "means for" or "step for" language being explicitly recited in the claims.

What is claimed is:

1. A computer-implemented method for securing a single page web application, comprising:
   receiving, at an application programming interface (API) server, a call from a single page application (SPA) to navigate a first user to a first state of the SPA;
   navigating, by the API server, the first user to the first state of the SPA;
   generating, by the API server, a first token indicating that the first user has previously accessed the first state of the SPA;
   receiving, by the API server, a request from the first user to navigate to a second state of the SPA, the request including the first token;
   verifying, by the API server, that the first token indicating that the first user has previously accessed the first state of the SPA is valid for the second state of the SPA;
   navigating, by the API server, the first user to the second state of the SPA based on the API server verifying the first token; and
   expiring, by the API server, the first token upon navigating the first user to the second state of the SPA.

2. The computer-implemented method of claim 1, further comprising:
   receiving, by the API server, a request from a second user to navigate to the second state of the SPA;
   attempting, by the API server, to verify whether there is a second token valid for the second state of the SPA; and
   denying, by the API server, the request from the second user to navigate to the second state of the SPA based on failing to verify the second token is valid for the second state of the SPA.

3. The computer-implemented method of claim 1, wherein verifying the first token is valid for the second state of the SPA further comprises verifying the first token is associated with the first user.

4. The computer-implemented method of claim 1, wherein verifying the first token is valid for the second state of the SPA further comprises:
   determining, by the API server, the first state of the SPA associated with the first token;
   identifying, by the API server, one or more transition rules applicable to the first state; and
   determining, by the API server, the request from the first user to navigate to the second state of the SPA satisfies at least one set of minimum requirements of the one or more transition rules.

5. The computer-implemented method of claim 1, further comprising:
   receiving, by the API server, a second request from the first user to navigate to the second state of the SPA, the second request including the first token;
   attempting, by the API server, to verify that the first token indicating that the first user has previously accessed the first state of the SPA is valid for the second state of the SPA; and denying, by the API server, the second request from the first user to navigate to the second state of the SPA based on the first token being expired.

6. The computer-implemented method of claim 1, further comprising:
determining, by the API server, that the second state of the SPA is not a terminal state of the SPA;
generating, by the API server, a second token indicating that the first user has previously accessed the second state of the SPA;
receiving, by the API server, a request from the first user to navigate to a third state of the SPA, the request including the second token;
verifying, by the API server, that the second token indicating that the first user has previously accessed the second state of the SPA is valid for the third state of the SPA;
navigating, by the API server, the first user to the third state of the SPA based on the API server verifying the second token; and
expiring, by the API server, the second token upon navigating the first user to the third state of the SPA, wherein the third state of the SPA is a terminal state of the SPA, and
wherein the API server does not provide an additional token to the first user at the third state of the SPA.

7. The computer-implemented method of claim 1, wherein the first and second states of the SPA are associated with respective first and second areas of the SPA providing distinct functionality through distinct API calls.

8. The computer-implemented method of claim 7, wherein the at least one of the distinct API calls is associated with: validating a subscriber identity module (SIM) number, getting details regarding user equipment (UE) devices, unlocking UE devices, or getting a list of the UE devices.

9. A computer system for securing a single page web application, comprising:
an application programming interface (API) server, the API server comprising:
one or more processors; and
a non-transitory program memory communicatively coupled to the one or more processors and storing executable instructions that, when executed by the one or more processors, cause the processors to:
receive an API call from a single page application (SPA) to navigate a first user to a first state of the SPA;
navigate the first user to the first state of the SPA;
generate a first token indicating that the first user has previously accessed the first state of the SPA;
receive a request, from the first user, to navigate to a second state of the SPA, the request including the first token;
verify that the first token indicating that the first user has previously accessed the first state of the SPA is valid for the second state of the SPA;
navigate the first user to the second state of the SPA based on verifying the first token; and
expire the first token upon navigating the first user to the second state of the SPA.

10. The computer system of claim 9, wherein the executable instructions further cause the processors to:
receive a request, from a second user, to navigate to the second state of the SPA;
attempt to verify whether there is a second token valid for the second state of the SPA; and
deny the request from the second user to navigate to the second state of the SPA based on failing to verify the second token is valid for the second state of the SPA.

11. The computer system of claim 9, wherein the executable instructions cause the processors to verify the first token is valid for the second state of the SPA by verifying the first token is associated with the first user.

12. The computer system of claim 9, wherein the executable instructions cause the processors to verify the first token is valid for the second state of the SPA by:
determining the first state of the SPA associated with the first token;
identifying one or more transition rules applicable to the first state; and
determining the request from the first user to navigate to the second state of the SPA satisfies at least one set of minimum requirements of the one or more transition rules.

13. The computer system of claim 9, wherein the executable instructions further cause the processors to:
receive a second request from the first user to navigate to the second state of the SPA, the second request including the first token;
attempt to verify that the first token indicating that the first user has previously accessed the first state of the SPA is valid for the second state of the SPA; and
deny the second request, from the first user, to navigate to the second state of the SPA based on the first token being expired.

14. The computer system of claim 9, wherein the executable instructions further cause the processors to:
determine that the second state of the SPA is not a terminal state of the SPA;
generate a second token indicating that the first user has previously accessed the second state of the SPA;
receive a request from the first user to navigate to a third state of the SPA, the request including the second token;
verify that the second token indicating that the first user has previously accessed the second state of the SPA is valid for the third state of the SPA;
navigate the first user to the third state of the SPA based on verifying the second token; and
expire the second token upon navigating the first user to the third state of the SPA, wherein the third state of the SPA is a terminal state of the SPA, and
wherein the processors do not provide an additional token to the first user at the third state of the SPA.

15. The computer system of claim 9, wherein the first and second states of the SPA are associated with respective first and second areas of the SPA providing distinct functionality through distinct API calls.

16. The computer system of claim 15, wherein the at least one of the distinct API calls is associated with: validating a subscriber identity module (SIM) number, getting details regarding user equipment (UE) devices, unlocking UE devices, or getting a list of the UE devices.

17. A tangible, non-transitory computer-readable medium storing executable instructions for securing a single page web application that, when executed by at least one processor of a computer system, cause the at least one processor to:
receive a call from a single page application (SPA) to navigate a first user to a first state of the SPA;
navigate the first user to the first state of the SPA;
generate a first token indicating that the first user has previously accessed the first state of the SPA;

receive a request, from the first user, to navigate to a second state of the SPA, the request including the first token;

verify that the first token indicating that the first user has previously accessed the first state of the SPA is valid for the second state of the SPA;

navigate the first user to the second state of the SPA based on verifying the first token; and expire the first token upon navigating the first user to the second state of the spa.

18. The tangible, non-transitory computer-readable medium of claim 17, wherein the executable instructions further cause the processors to:

receive a request, from a second user, to navigate to the second state of the SPA;

attempt to verify whether there is a second token valid for the second state of the SPA; and deny the request from the second user to navigate to the second state of the SPA based on failing to verify the second token is valid for the second state of the SPA.

19. The tangible, non-transitory computer-readable medium of claim 17, wherein verifying the first token is valid for the second state of the SPA further comprises verifying the first token is associated with the first user.

20. The tangible, non-transitory computer-readable medium of claim 17, wherein the executable instructions cause the processors to verify the first token is valid for the second state of the SPA by:

determining the first state of the SPA associated with the first token;

identifying one or more transition rules applicable to the first state; and determining the request from the first user to navigate to the second state of the SPA satisfies at least one set of minimum requirements of the one or more transition rules.

* * * * *